United States Patent [19]
Ohshima et al.

[11] 3,905,122
[45] Sept. 16, 1975

[54] METHOD FOR DRYING POLYMER HYDROGEL

[75] Inventors: Iwao Ohshima; Seiichi Chiba; Yukio Shibuya; Haruhiko Ishikawa, all of Yokohama, Japan

[73] Assignee: Nitto Kagaku Kogyo Kabushiki Kaisha, Japan

[22] Filed: Apr. 29, 1974

[21] Appl. No.: 465,299

[30] Foreign Application Priority Data
May 2, 1973   Japan.............................. 48-49508

[52] U.S. Cl. .............................. 34/17; 34/12; 34/60
[51] Int. Cl.² ............................................ F26B 7/00
[58] Field of Search ................ 34/12, 14, 17, 60, 61

[56] References Cited
UNITED STATES PATENTS
2,833,750   5/1958   Vickers.............................. 34/12 X
3,067,462   12/1962   Kullgren ................................ 34/61

Primary Examiner—John J. Camby
Attorney, Agent, or Firm—Robert E. Burns; Emmanuel J. Lobato; Bruce L. Adams

[57] ABSTRACT

In a method for drying a hydrogel of polymers, the gel is extruded through a perforated plate with shearing forces applied traversely along a surface of the perforated plate. The polymer gel thus formed into aggregates, cut into series of globules and then stuck together into a plurality of masses of strand-like configuration which are then dried out by hot air under the application of shearing forces, so that the strand-like aggregates are separated into individual globules whereby further drying and grinding is made possible.

13 Claims, 3 Drawing Figures

METHOD FOR DRYING POLYMER HYDROGEL

BACKGROUND OF THE INVENTION

This invention relates generally to techniques in drying polymeric hydrogels, and more particularly to a method for drying a polymeric hydrogel, which is in itself water-soluble and adhesive, so that the resultant product can be pulverized into a granular form.

The fluidity or viscosity of a water-soluble polymer uniformly polymerized from a monomer in an aqueous medium varies depending on the concentration, the degree of polymerization, and the structure of the starting monomer. According to the present invention, a method is provided for drying a polymeric hydrogel, the viscosity of which is so high that it cannot be transported through pipe lines. The invention will be described hereinafter with respect to a typical example consisting of an aqueous acrylamide polymer gel which is highly adhesive and easily deteriorated at a specific temperature.

Water-soluble acrylamide polymers have been produced on an industrial scale, and are used widely for strengthening paper in its wet or dry state, flocculation and cleaning of waste water of various sources, coagulation and sedimentation of ores, and for providing vehicles for supporting pigments or pulp-dispersing agents in the paper producing industry. Among these, the application of the polymer gel to the cleaning of river water or waste water of domestic or industrial source is now rapidly expanding. In the case where a water-soluble acrylamide polymer is used as a flocculant or dispersant, it is considered that the activity of the flocculant or dispersant is promoted in accordance with the increase in molecular weight of the polymer, and hence a polymer of even higher molecular weight is sought.

However, an aqueous solution of water-soluble acrylamide polymers, which is polymerized in an aqueous medium, will have a viscosity elevated in accordance with the increase in the molecular weight. This tendency is further multiplied with the increased concentration of the polymer. This aqueous solution of water-soluble acrylamide polymer is also very adhesive. Because of the above described nature of the water-soluble acrylamide polymer, difficulties are encountered when it is desired to pack an aqueous solution of the polymer in an acceptable form. Since long hours are required for diluting the polymer of a high concentration into a solution of a desired concentration, it is advantageous for the users that the polymer solution be packed and delivered to the users at a low concentration. This, however, is wastefully disadvantageous for the producer because a great quantity of water must be transported during the transportation of the water-soluble, acrylamide polymer.

Because of the demand on the part of the users seeking facility in delution of the polymer on the one hand, and the demand on the part of the producer seeking facility in packing and economy in transportation on the other hand, it is urgently required that the water-soluble acrylamide polymer be dried out and delivered in a pulverized form.

The physical behavior of the water-soluble acrylamide polymer, produced in an aqueous medium, varies over a wide range depending on the composition and the concentration of the monomer at the time of the polymerization, and also on the degree of the polymerization.

The water-soluble acrylamide polymer polymerized from starting monomers of a more few percent of concentration can be very viscous when the molecular weight of the polymer is elevated to approximately 8,000,000, although the polymer of the above-mentioned concentration can still be transported through pipe lines. However, when the polymer concentration is further elevated, the polymer gel will assume an elastomeric constitution with elasticity and viscosity so high that it cannot be handled as a liquid.

Methods for dehydrating the aqueous acrylamide polymer comprising the steps of drying it directly or drying it by the use of an organic solvent, which is soluble in water but which cannot dissolve the polymer, are known. By these methods, it is theoretically possible to dry out the aqueous acrylamide polymer to an extent that it can be pulverized into granular form. However, to dry out the aqueous acrylamide polymer practically through these methods has been found to be extremely difficult because of its high viscosity and low transition rate for moisture and heat.

Should the drying processes in these methods for realizing the pulverization of the polymer be sufficiently simple, it is apparent that the direct drying method is competent over the indirect methods from the viewpoint of economy. However, proposals related to the utilization of a solvent or of further uneconomical sedimentation polymerization or suspension polymerization are still found sporadically among recent patent documents. This indicates the difficulty existing in drying the aqueous acrylamide polymer to a pulverizable extent.

The aqueous acrylamide polymer gel is extremely adherent to other materials and coherent in itself. In addition, the drying rate thereof is progressively reduced in accordance with the reduction of the moisture content, since diffusion rate of moisture from the interior to the outer surface of the gel becomes an important factor affecting the drying rate. Furthermore, bridging structures or cross-linking tends to be created by a temperature rise caused by, for instance, imidizing reaction which may easily occur between separate molecules or in each molecule, and if the cross-linked bridging-structure starts to be formed, this gives rise to the disadvantage of the polymer becoming insoluble in water.

In order that the polymer can be dried out effectively particularly in the later part of the drying operation without loss of the water-solubility of the polymer, it is desirable that aqueous acrylamide polymers, now highly viscous and elastic, is formed for instance into thin flakes, slim bars, or fine granules, which forms are helpful in maintaining the drying speed of the polymer at a comparatively high value during the period of low contents of moisture. On the other hand, in the earlier part of the drying operation of the aqueous acrylamide polymer, the polymer gel is extremely adherent to other materials or coherent in itself, and it is not easy to form the polymer gel into the above-mentioned flakes and the like.

Various methods have been proposed for forming the polymer gel into configurations advantageous for the subsequent drying operation. In one of the methods for forming the polymer gel into a configuration such as thin flakes, a drum type dryer is used. Although the operation of the machine is comparatively simple, the drying temperature therein cannot be varied as desired. Thus, when the drying machine is operated at a sufficiently low temperature for preventing deterioration of the polymer gel (approximately lower than 70°C for Nonion type polymers, although the temperature is somewhat varied by the composition and the rate of hydrolysis of the polymer gel), an extremely long period is required for drying the polymer gel as desired. Such an operation is not permissible from the viewpoint of operational economy, and it is imperative that the temperature be elevated in excess of the above described value which would invite possibility of deteriorating the polymer gel.

Alternatively, a method for extruding the polymer gel into a layer of cords, so that the cords are not stuck together, on a belt conveyor made of a material less adherent to the aqueous polymer gel is known. The polymer gel thus formed into a layer of cords is thereafter dried out on the belt until no adhesion is shown between each of the cords, whereupon the product is dried out in an ordinary method.

All of the above described conventional methods utilize advantageous features of the direct drying process. The methods are accompanied with a drawback of the great amount of water that must be removed by the drying operation, since the polymer gel is polymerized in a fluidized condition and hence the resultant polymer gel contains a great amount of water.

Such problems occur not only in the case of drying the acrylamide polymer gels, but also in the case of drying ordinary high viscosity aqueous polymer gels, and an economical method, simple in operation, and allowing drying of polymer gels of high molecular weight has been urgently sought.

SUMMARY OF THE INVENTION

A primary object of the present invention is to provide a method for drying aqueous polymer gels whereby the drawbacks of the conventional methods can be substantially eliminated. According to the present invention, the polymer gel is extruded through a perforated plate, having a number of holes bored therethrough, and simultaneously cut by the application of shearing forces before or after the polymer gel is extruded through the perforated plate, so that aggregates, each consisting of a series of globules mutually stuck together are obtained; and then the aggregates are dried out by hot air under application of shearing forces.

Thus, the method for drying polymer gel according to the present invention comprises the following steps in combination:

1. extruding the aqueous polymer gel through a perforated plate and cutting the polymer gel between a part thereof received in the holes of the perforated plate and a part thereof not yet received in the perforated plate by applying a shearing force along the internal surface of the perforated plate so that a plurality of aggregates each consisting of a series of mutually adherent globules of the polymer gel are thereby obtained; and 2. drying these aggregates by hot air while applying shearing forces so that the aggregates of the polymer gel are separated into individual globules showing substantially no adhesion between each other.

Alternatively the method for drying polymer gel according to the present invention may be modified in such a manner that it comprises the following steps in combination:

1. extruding the aqueous polymer gel through a perforated plate and cutting the polymer gel thus extruded outside of the perforated plate by application of a shearing force acting along the outer surface of the perforated plate to that series of aggregates each consisting of mutually adherent globules of the polymer gel can be thereby obtained; and 2. drying these aggregates by hot air under application of another shearing force until granules of the polymer gel at least showing no mutual adhesion are thereby produced.

As described above, the method according to the present invention utilizes the nature of the aqueous polymer gel in such a manner that when the polymer gel is cut by the application of a shearing force during the extrusion, the pieces of the polymer gel thus cut are stuck together due to the great adhesive force so that series of aggregates each consisting of mutually sticking globules are produced from the polymer gel, and when the aggregates thus produced are dried out under the application of shearing force, the aggregates can be broken into granules because the adhesive force between the mutually sticking globules is smaller than the cohesive force in the globules.

According to another aspect of the present invention, specific nitrilotriscaboxylic acid compounds and aminoacid compounds may be added in the starting aqueous polymer gel for preventing the creation of nonsoluble substance when the granular product thus obtained is dissolved in water to be used for the above described purposes.

DETAILED DESCRIPTION

Figure 1:
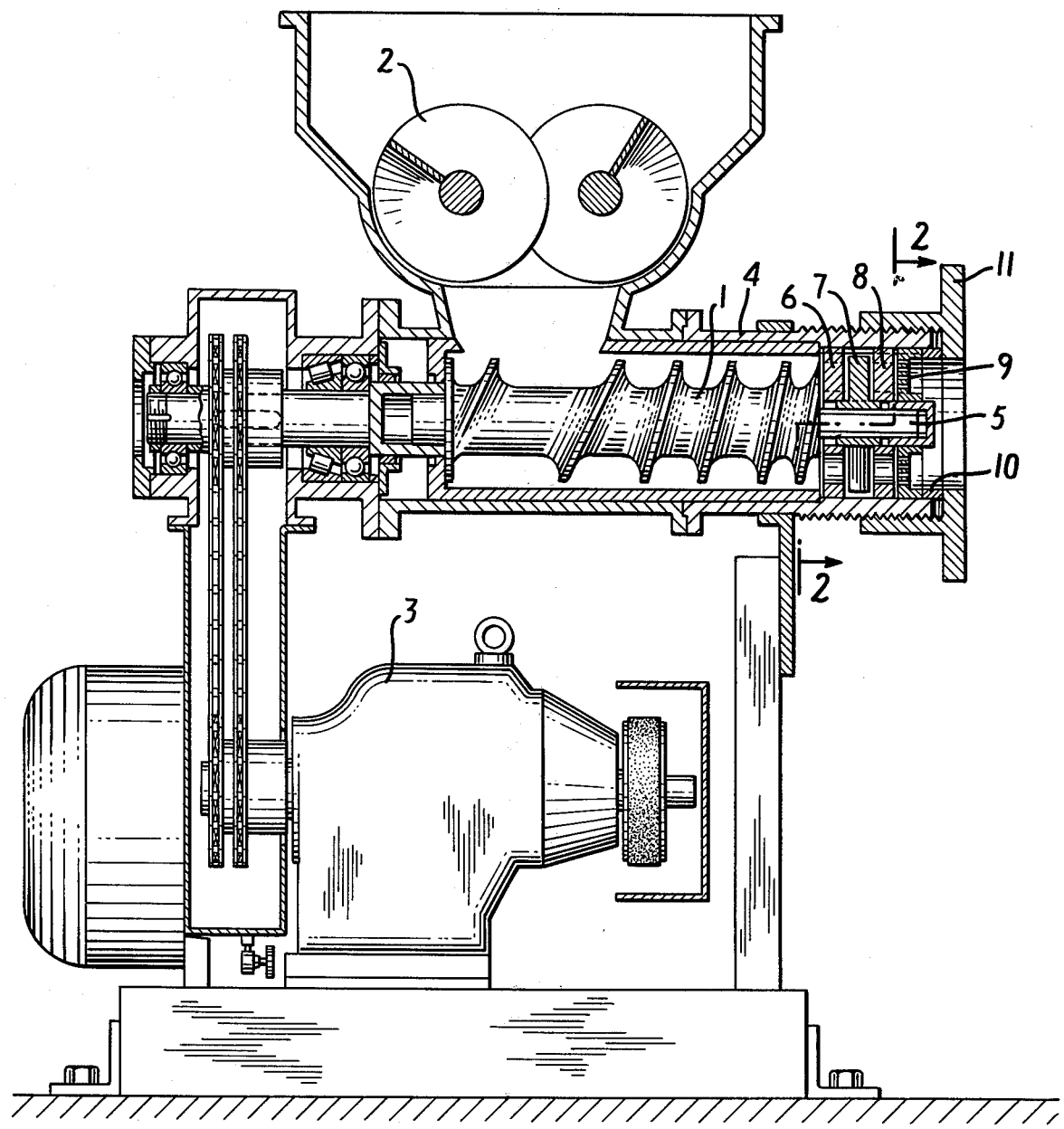

1. Aqueous Polymer Gel:

The present invention is applicable to aqueous solutions of water-soluble polymers (hereinafter referred to polymer gel or simply the gel) of a molecular weight more than approximately 3,000,000, and/or a concentration of more than 18% by weight. This kind of gel exhibits a high cohesive force, and a high adhesive force, adhering to other materials.

The polymer gel can be polymerized in aqueous medium from the corresponding monomer or monomers. When it is desired to produce a polymer having a molecular weight of more than 12,000,000, it is required to add a small amount of catalyst or to reduce the polymeric impurities which might be included therein.

Polymer gels which can be dried out, according to the present invention, are those of molecular weights exceeding 5,000,000 and/or of high concentration more than 21% by weight, and the content of polymeric substance which cannot be dissolved in water is zero or extremely small.

Typical examples of the water-soluble polymers are acrylamide polymers, acrylic acid polymer, acrylic or methacrylic acid hydroxyalkyl (the alkyl being of $C_2 - C_3$) esters, and others (of homo- or copolymer).

Of these, the most important are the acrylamide polymers. The term acrylamide, herein described, includes, besides of the non-substitutable acrylamide ($CH_2 = CHCONH_2$), $\alpha$-, $\beta$-, or N-substituted acrylamide derivatives, mixtures of two or more of these derivatives, and mixtures of one of these and a small amount of other water-soluble monomers. Practical examples of the mixture of the monomers include a mixture of acrylamide and methacrylamide, acrylamide and methylol acrylamide, and a mixture of major amount (more than 50% by weight) of the above-mentioned acrylamide or its derivative and preferably other water-soluble monomers, such as acrylic acid or its salts, methacrylic acid or its salts, acrylic or methacrylic acid hydroxyalkyl (for instance, ethyl or propyl) esters, acrylonitrile, methacrylonitrile, acrylic acid lower alkyl (less than $C_4$) esters, etc.

2. Formation of the Globules:

The formation of the globules can be attained in two different ways, one is by forming them before the extrusion of the polymer gel through the perforated plate (globulation before the extrusion), and the other forming them after the extrusion through the perforated plate (globulation after the extrusion). The former method is suitable for the polymer gel of extremely great molecular weight and/or extremely high concentration, utilizing the high viscosity and elasticity advantageously, and the latter method is suitable to be applied to the polymer gel of comparatively low molecular weight and/or concentration which can be extruded relatively easily through the perforated plate.

a. Globulation before the extrusion

The polymer gel of extremely high molecular weight and/or extremely high concentration is of an elastomeric constitution. When the polymer gel of such constitution is pressed against the perforated plate (by means of any compressing means such as helical feeder or plunger), it cannot be extruded continuously, although the gel is allowed to project partly into the holes of the perforated plate. Of course, when an excessive compressive force is applied to the elastomeric polymer gel, it is possible that the polymer gel is forced to project more than this and is extruded through these holes. However, in such a case, deterioration of the polymer gel tends to occur because of the possible cutting in the molecular structure.

However, if a cutter having a single blade or a plurality of blades is provided, operable along the inner surface (contacting with the polymer gel placed in the extruder) of the perforated plate, and the part of the polymer gel thus projecting into the holes of the perforated plate is cut by the cutter, the globules thus formed can easily pass through the holes of the perforated plate, and continuous extrusion of the elastomeric polymer gel is thereby made possible.

Thus, when the term "continuously producing globules of the aqueous polymer gel", is used herein this does not necessarily indicate absolutely continuous globules, but also includes intermittently produced globules.

Since the polymer gel is highly adhesive, the globules thus passing through each hole in the perforated plate are stuck together to be formed into a cord-like configuration. Since the spacing between adjacent holes in the perforated plate is ordinarily a small distance, aggregates extruded through adjacent holes are ordinarily stuck together lightly.

Thus, it should be noted that "the cord-like aggregates" described in this specification include those wherein a plurality of the cord-like aggregates are lightly stuck together as described above.

When the cord-like aggregates are left for a while in the stuck state, the adhesion between the cord-like aggregates tends to be strengthened with the passage of time until the aggregates are finally stuck together into a single mass of the polymer gel. This can be avoided by subjecting the aggregates to a drying step before the globules in the cord-like aggregates can stick together as described above. The drying operation is carried out under the application of a shearing force to the cord-like aggregates while the latter are exposed to hot air circulated therearound, as will be disclosed hereinafter.

The formation of the globules can be achieved by any suitable extrusion device comprising a chamber to receive the polymer gel, a perforated plate, a mechanism for feeding the polymer gel toward the perforated plate, and a shearing mechanism which is provided, in this example, to be operable along the inner surface of the perforated plate thereby to cut the polymer gel at that position.

Figure 2:
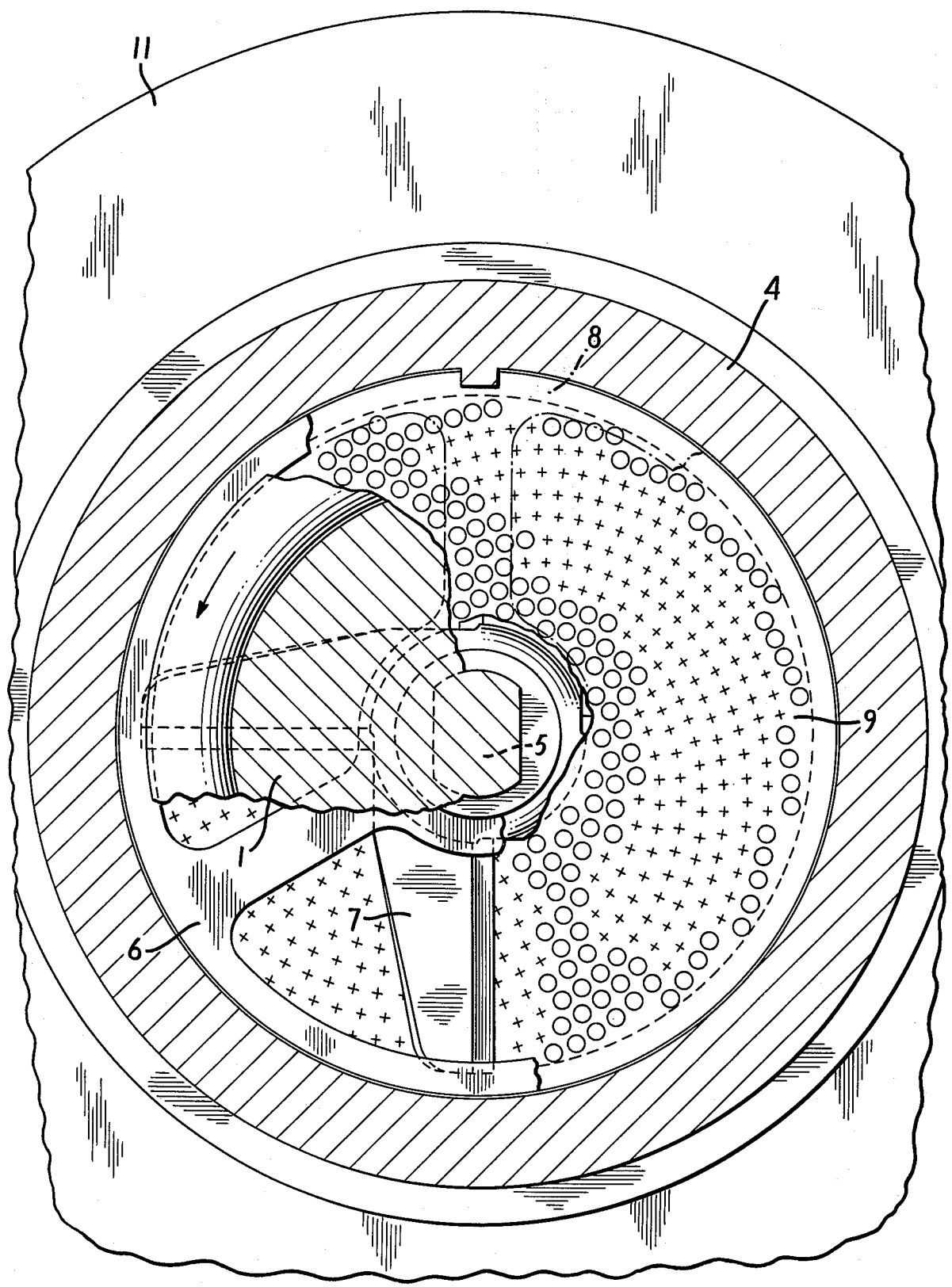

A typical example of such a device provides a cutter of a single blade or a plurality of blades securely mounted on the shaft of a helical feeding mechanism; such that the cutter can be operable in contact with the inner surface of the perforated plate as in the case of a meat-grinder. FIGS. 1 and 2 illustrate a meat cutter-type apparatus for globulation before extrusion. FIG. 1 is a partially cut away view of such an extruder and FIG. 2 is an enlarged sectional view of the parts enclosed by the dotted line to 2 of FIG. 1. The feed gel is fed to helical screw 1 by feeder screw 2 in the gel hopper. The fed gel is advanced by helical screw 1 driven by motor 3. As it advances, it is confined and compressed within sleeve 5 and then pressed through step plate 6 where the extruded gel is cut by cutter 7 mounted on an extension shaft 5 of helical screw. The gel after being cut by cutter 7 is pressed through the openings of second plate 8 and is then extruded through the holes in the extruder head 9. Extruder head 9 is maintained in place by compression ring 10 which is adjusted by tightening handle 11. When in operation, the helical screw 1, plate 7, cutter 8, and extruder 9 are in proximate contact with each other. The gel advanced through sleeve 4 is passed through plate 6 and is cut by cutter 7 and the cut particles are advanced and extruded through the holes in extruder 9.

The similarity to commercial meat cutters will be apparent.

b. Globulation after the extrusion

When the polymer gel is not of extremely high molecular weight and/or high concentration, the gel can be comparatively easily extruded, without impairing the molecular structure of the polymer gel, into the cord-like aggregates of uniform thickness. Since the cord-like aggregates (inclusive those stuck together) in that state are difficult to dry as described above, they are cut into globules by a cutter operable in substantial contact with the outer surface of the perforated plate. The apparatus of FIGS. 1 and 2 can be modified by placing the cutters external to the plate. The apparatus for performing this globulation after extrusion function is similar to the household type of meat grinder wherein the meat is first extruded and is then cut. To perform this function, the apparatus of FIG. 1 is modified by transposing the positions of cutter 7 and extruder 9.

In the case where the aggregates thus extruded are thereafter cut, the globules of the polymer gel are formed into planar configuration of comparatively thin discs or plates (if the holes of the perforated plate are circular, the globules are formed into a circular disc-like configuration). Since the adhesion between these planar shaped globules also is still high, these globules are stuck together into cord-like aggregates. Although the cutting operation is effectuated continuously by means of a cutter having a single cutting blade or a plurality of cutting blades, the globules of a highly adhesive nature are again lightly stuck together into the cord-like configuration. It should be noted that the aggregates herein described include those of the above described secondary configuration. The aggregates of the globules are then subjected to a drying process utilizing hot ventilated air.

It should be noted that the above described formation of globules is carried by the use of an extruding machine the design and construction thereof being quite similar to that described above except that the cutter is provide outside of the perforated plate.

Figure 3:
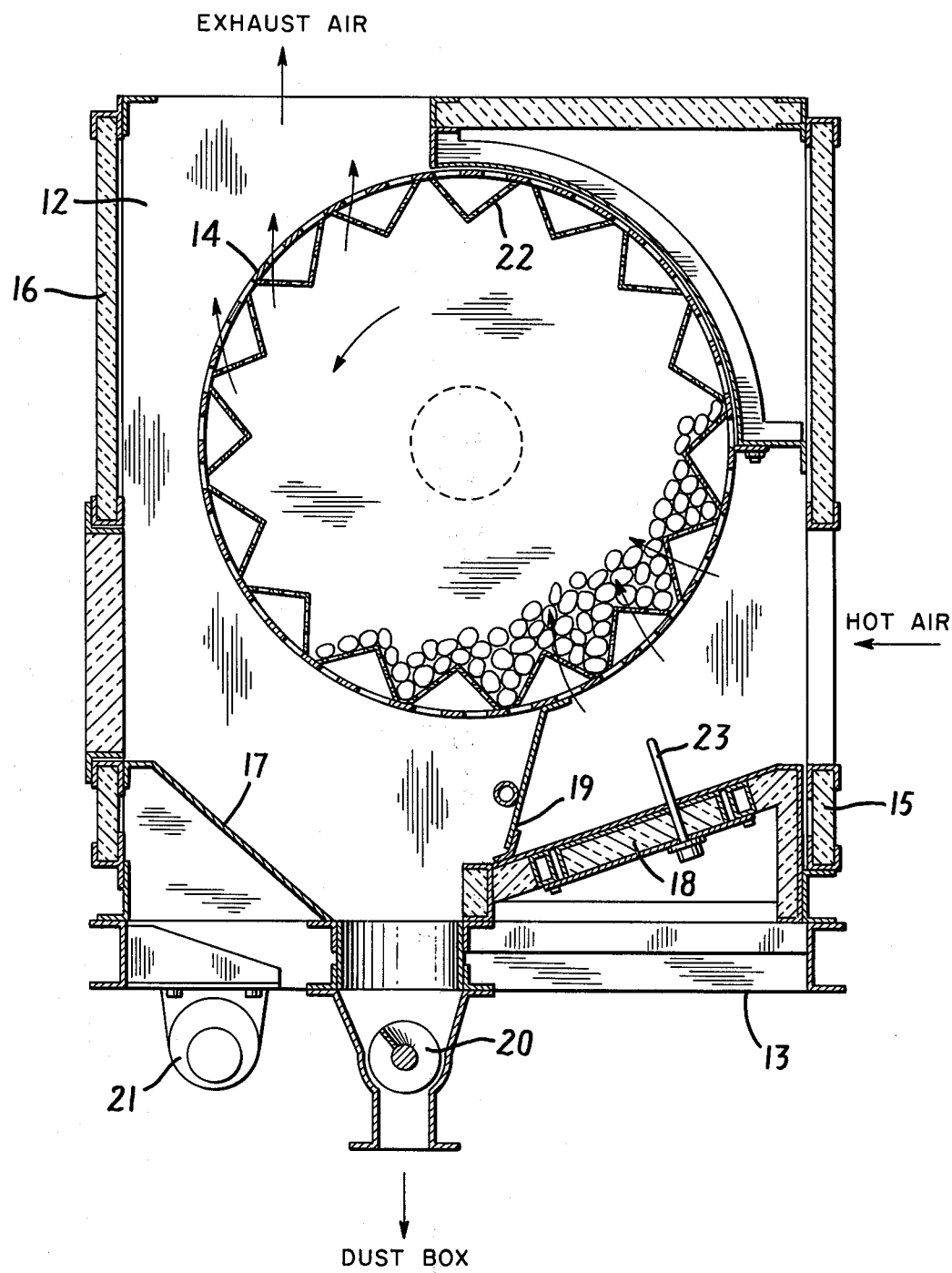

3. Drying Process Under Application of Shearing Force:

The aggregates of polymer gel, each consisting of a series of globules stuck together into a strand as described above, are thereafter dried out under ventilation of hot air. More specifically, the aggregates may be thrown into a rotary drum type hot air drying machine, and dried out by hot air blown into the drying machine as shown in FIG. 3, which is a perspective view of a commercial rotary drum type hot air drying dryer. This type of dryer is designed for drying masses of particles, flakes, or small lumps and is provided with a hopper (not shown) for feeding such particulate masses to the dryer.

Dryer 12 of FIG. 3 is provided with a ground frame 13 and rotary drying drum 14. The perforated rotary drum 14 has mounted therein perforated plates 13 arranged in triangular form to provide lifting louvres 22. The particulate material is fed into drum 14 from a hopper (not shown) in a direction transverse to the section illustrated in FIG. 3. The material moves along this transverse line of feed and is continuously rotated and tumbled when drum 14 is rotated. A shearing force (tumbling) is applied to the individual globules by the rotating motion of the drum. Hot air is introduced into the dryer as indicated and passes through the perforations in the body of the drum 14 into the interior thereof through perforations in plates 22. The introduced hot air enters at the lower portion of the drum and is deflected therethrough from its entering port by drum seal 19. After contacting the moist material, the moisture laden air is vented from the dryer as indicated. Any dust resulting from the tumbling and shearing forces during the drying of the globules, leaves drum 14, falls to chute 17 and is removed from the drum 14 by dust disposing screw 20, driven by motor 21 into the dust box.

The temperature of the hot air entering the dryer is controlled and adjusted by temperature indicator 23 positioned adjacent to the introduction port for the dry air and the portion of the perforated drum where the hot air enters the drying drum. The dry globules leave the dryer through a portal (not shown) and are then ready for further processing if necessary.

Along with the progress of the drying operation, the globules of the aggregates are separated from each other into individual pieces of the globules in a state thought to be most advantageous for drying the polymer gel in a low moisture-containing range. It is considered that such a separation of the globules is caused by a reduction in the adhesive force between the globules due to the lowering in the moisture content in the surface portion of the globules, and also by the frictional shearing force created by the movement of the aggregates due to the rotation of the drying drum acting upon the globules, so that globules which are stuck together are thereby separated.

Furthermore, since the globules of the polymer gel are constantly moved in the drying drum while the latter is rotated as described above, the globules are heated uniformly by the hot air, and the possibility of irregular heating of the globules is far smaller than in other methods wherein the globules kept in stationary state are dried out by ventilated air.

An aqueous arcylamide polymer gel having a molecular weight of approximately 8,000,000 before it is dried out, and formed into aggregates consisting of series of globules, exhibits extremely strong adherence to metal and other materials when the moisture content thereof is greater than approximately 50%. When such a polymer gel is dried in the drying drum, the polymer gel easily adheres to the inner surface of the drying drum, thus giving rise to uneven drying and degradation of the polymer gel.

For eliminating this disadvantageous phenomenon, it is preferable that the inner surface of the drum type drying machine used for drying highly adhesive polymer gel be made of a substance such as a fluorine resin which is heat-resistant and less adhesive to other material than metal.

In addition, for the purpose of disintegrating the aggregates which have been secondarily stuck together at the delivering part of the extruder, it would be advisable that a lifter, made of a material selected in accordance with the adhesive nature of the polymer gel, be provided in the drying machine, and/or a disintegrator made of a similar material be provided at the entrance portion of the drying machine. It may also be advisable, for disintegrating the aggregates, that agitating blades secured to a rotating shaft extending along the central axis of the drying drum be provided in the drying drum.

It has been found, however, that when the aggregates of the polymer gel are placed in the above described rotary drum type drying machine and rotated therein under a ventilation of comparatively cool air or without ventilation, the aggregates are not disintegrated into pieces of globules as described above, but are integrated into larger blocks of the polymer gel. From this finding, it will be apparent that the method according to the present invention makes it possible to disintegrate and dry the sticky aggregates of the polymer gel, without utilizing any positive mechanical disintegrating method, but by rotating the aggregates in the drum, so that the aggregates are moved relative to each other even in the condition which is thought to be conducive to the integration of the aggregates into blocks of greater sizes an described above.

It is considered that the reason for this is (although the invention is not limited by such consideration) as follows.

The drying rate of the globules of the polymer gel is much influenced by the diffusion rate of the moisture from the interior to the surface of the globules. Even in a seemingly constant drying range of the globules, the drying rate for the interior portion of each globule is suppressed by its comparatively low diffusion rate of moisture, whereby the surface of the globule is dried out faster than the interior portion of the globule and the adhesive force sticking these globules together is also reduced. Thus, when a frictional shearing force applied upon the globules exceeds the adhesive force, the globules combined into aggregates, as described before, are separated from each other.

With the above described nature of the present invention in view, wherein the object of the invention is achieved by a combination of dynamic properties of the globules, it is found difficult to clearly define the viscosity range of the polymer gel to which the method of the present invention is applicable. More specifically, the viscosity of the polymer gel is varied by concentration, the degree of polymerization, and the monomeric composition (or rate of hydrolysis) of the polymer. Thus, it can only be defined that the polymer gel to which the drying method of this invention is applicable is of a kind having an adhesive force which can be overcome by the frictional shearing force acting upon the globules when the aggregates of the polymer gel is placed and rotated in the drum type drying machine having an internal surface made of a substance selected to suit to the polymer gel thus dried out inside of the drying machine. The above-mentioned feature further indicates that the drying method according to the present invention is not necessarily limited to the aqueous acrylamide polymer gel but is applicable to polymer gels of various kinds.

Although hot air may be blown into the drum of the drying machine in parallel, perpendicular, or in an alternating manner with respect to the movement of the polymer gel in the drum, preferably the hot air at a temperature which is varied in accordance with the progress of the drying operation, is blown into the drum perpendicular to the movement of the polymer gel. The temperature of the hot air can be varied in accordance with the progress in the drying operation in a range of from a temperature higher than approximately 55°C to a temperature lower than a value at which the polymer gel tends to be deteriorated.

The blowing of hot air may be carried out at any suitable manner. However, it is preferable that the blowing speed or rate of hot air be selected to a higher value from the viewpoint of elevating the drying speed of the polymer gel. The rotating speed of the drum may be selected arbitrarily so far as a desired shearing force can be applied to the globules of the polymer gel.

Since the object of the drying operation according to this invention is to dry out the polymer gel to an extent such that at least the adhesive force between globules is substantially lost and the aggregates of the polymer gel are separated into individual globules, the drying operation should be continued for a sufficient period, or in the case of a continuous operation, the rotating drum must be provided with a sufficient length. By this way, sufficiently dried out globules of the polymer gel can be obtained after termination of the drying operation or can be delivered from the delivering port of the rotary drum continuously. Alternatively, the drying period or the length of the drying drum may be selected to a short value, and globules of the polymer gel not yet sufficiently dried out may further be dried out in an additional drying machine.

4. Insolubilization Preventing Agent:

By adding an insolubilization preventing agent into the aqueous acrylamide polymer gel when the latter is dried out, creation of insoluble matter during the drying operation can be substantially prevented, so that the polymer gel can be utilized effectively. The insolubilization preventing agent may consist of aminoacid compound or nitrilotricarbonic acid compound. As for the aminoacid compound, glycine, $\beta$-alanine, or glutanic acid may be used advantageously. Aminoacid compounds other than those described above may also be used for the achievement of the object of the present invention. However, these compounds are generally expensive, and hence cannot be used economically.

On the other hand, the nitrilotricarbonic acid compound may be selected from among nitrilo-triacetic acid, nitrilo-trispropionic acid, nitrilo-trisbutyric acid, nitrilo-monoacetic acid-dipronionic acid, nitrilo-diacetic acid-monopropionic acid, nitrilo-monoacetic acid-dibutyric acid, nitrilo-diacetic acid-monobutyric acid, nitrilo-monopropionic acid-dibutyric acid, nitrilo-dipropionic acid-monobutyric acid; sodium, potassium, or ammonium salts of some or all of the carboxyls of these acids; amide derivatives of some or all of the carboxyls of these acids; and mixtures of these salts and amido derivatives.

It would be sufficient that the insolubilization agent be in the aqueous acrylamide polymer gel at least when the latter is actually dried out, and the content of the agent in the polymer gel is selected to be in a range of from 0.1 to 10%, preferably from 0.5 to 5% by weight of the polymer gel.

EXAMPLE 1

A rotary drum made of a perforated plate and having a maximum diameter of 470 mm and a longitudinal length of 560 mm was used for drying out the polymer gel. The rotary drum was made of a perforated plate having a number of holes of 2 mm in diameter and distributed with 4 mm in pitch, the plate being further corrugated in such a manner that the cross sectional configuration of the rotary drum resembles a multi-point star having a series of equilateral triangles, of 50 mm in one side, arranged around the central axis of the drum. The drum was coated with fluoric resin for providing suitable separration from the polymer gel.

An inlet port was provided below the rotary drum so that it opens through an angular range, as viewed in the direction of the longitudinal axis of the drum, from 0° to 70° measured relative to a downwardly extending vertical plane including the axis.

When the drum was rotated at 4.5 rpm with the simultaneous introduction of hot air through the inlet port, the polymer gel placed inside of the rotary drum was heavily agitated due to the equilateral triangular corrugation of the perforated drum wall, while hot air passes through the perforated drum wall and the polymer gel toward an exhaust port provide upward of the rotary drum.

The polymer gel was prepared as follows. 4.4 kg of acrylamide and 0.11 kg of nitrilotrispropion amide, was uniformly dissolved in 15.6 kg of water, and the solution was thoroughly deoxidized by blowing nitrogen gas into the solution, added with 2.0 g of 2,2'-azobis-2-amidinopropanhydrochloride as an initiator, and polymerized at 30°C under an adiabatic state.

15 kg of the polymer gel thus obtained and at a degree of hydrolysis equal to 0.6% was subjected to extrusion in an extruding machine including a perforated plate having holes of 3.2 mm in diameter and provided with a cutter type shearing means at the downstream of the perforated plate.

All the aggregates of the acrylamide polymer gel thus obtained were placed in the above-mentioned drying drum and dried at 80°C for 30 min. by hot air supplied at a rate of 0.6 m/sec. measured at the entrance of the inlet port, and further dried at 65°C for 240 min. After the drying operation, globules of average moisture content of 12% were obtained. The powdery product obtained by grinding the thus produced globules was found to be easily soluble in water.

EXAMPLE 2

5.2 kg of acrylamide, 0.4 kg of sodium hydroxide, 0.24 kg of nitrilotrispropionamide, and 0.48 kg of boric acid were dissolved in 14.8 kg of water thereby rendering a uniform solution. The solution is deoxidized by nitrogen gas, added with 0.8 g of potassium persulfate as an initiator so that the acrylamide is polymerized at 19°C under adiabatic condition. When the temperature of the solution reached 97°C, it was kept at this temperature for 20 hours for maturing the polymerization. After the maturing operation, acrylamide polymer gel of 36% hydrolysis could be obtained.

15 kg of the polymer gel was extruded and dried out as described in Example 1 except the drying operation was carried out by hot air introduced through the inlet port at a speed of 0.6 m/sec. under a drying condition of at 120°C for 20 min. and then at 100°C for 150 min., whereby globules at average moisture content of 11% were obtained.

The globules were then ground into powdery substance which was found easily soluble in water.

EXAMPLE 3

4.18 kg of acrylamide and 0.22 kg of demethylaminoethylmethacrylate were uniformly dissolved in 15.6 kg of water, and the solution was thoroughly deoxidized by nitrogen gas. After addition of 2.0 g of 2-2'-azobis-2-amidinopropanhydrochloride as an initiator, polymerization was undertaken under adiabatic condition, thus producing a cationic acrylamide polymer gel.

15 kg of the polymer gel was extruded and dried out as described in Example 1 using hot air introduced at 0.6 m/sec. through the inlet port, under drying condition of at 90°C for 30 min. and then at 65°C for 210 min. As a result, globules of 13% moisture content could be obtained. Powdery substance produced by grinding the globules was found to be easily soluble in water.

EXAMPLE 4

3.36 kg of acrylamide and 3.64 kg of 2-acrylamide-2-methylpropansulphonic acid were uniformly dissolved in 12.5 kg of water. The solution was thoroughly dioxidized by nitrogen gas, and then added with 2.0 g of 2,2-'-azobis-2-amidinopropanhydrochloride as an initiator. Polymerization was carried out under adiabatic condition so that an anionic acrylamide gel could be obtained.

15 kg of the acrylamide gel was extruded and dried out as described in Example 1 with the entrance speed of the hot air of 0.6 m/sec., under a drying condition of at 80°C for 35 min. and then at 65°C for 210 min. The globular product thus obtained was of 13% average moisture content.

We claim:

1. A method for drying a polymer hydrogel comprising the following steps in combination:

1. extruding the polymer hydrogel through a perforated plate while the polymer hydrogel is cut at a portion between a part thereof received in the holes of the perforated plate and a part continuous to the part received in the holes by the application of a shearing force along a surface of the perforated plate, whereby a plurality of aggregates each consisting of mutually sticking globules of the polymer hydrogel are obtained; and 2. drying the aggregates with hot air in a drying device under rocking or rotation under application of shearing force due to the relative difference in moving speed of the drying device, said shearing force being applied in order to avoid the aggregates from forming a single mass of gel thereof and desintegrate the aggregates with the progress of the drying into individual globules whereby a maximum drying surface of the aggregates is always maintained; thereby to finally dry and disintegrate most of the aggregates into the individual globules substantially showing no tendency of adhesion between each other.

2. A method as set forth in claim 1 wherein said shearing force applied between two parts of the polymer hydrogel in step (1) is applied along the inner surface of the perforated plate.

3. A method as set forth in claim 1 wherein said shearing force applied between the two parts of the polymer hydrogel in step (1) is applied along the outer surface of the perforated plate.

4. A method as set forth in claim 1 wherein said shearing force applied between the two parts of the polymer gel is created by a blade cutter.

5. A method as set forth in claim 1 wherein said aqueous polymer gel is polymerized from water-soluble monomer containing acrylamide as a major part thereof.

6. A method as set forth in claim 1 wherein said aqueous polymer gel has a molecular weight higher than 3,000,000.

7. A method as set forth in claim 1 wherein said aqueous polymer gel has a concentration higher than 18% by weight.

8. A method as set forth in claim 5 wherein said water-soluble monomer is a mixture of acrylamide, and one or more selected from acrylic acid, methacrylic acid, salts of acrylic or methacrylic acid, hydroxy low-grade alkylester (alkyls containing approximately 2–3 carbons) of acrylic acid or methacrylic acid, acrylonitrile or methacrylonitrile, and acylic acid lower-grade alkylester (alkyls containing less than four carbons).

9. A method as set forth in claim 1 wherein said aqueous polymer gel is extruded by an extruder comprising a pressurizing chamber, a perforated plate, a feeding mechanism forcing the polymer gel in said pressurizing chamber toward the perforated plate, and a shearing device acting adjacent the perforated plate, whereby a plurality of aggregates each consisting of a series of cord-like globules are obtained.

10. A method as set forth in claim 1 wherein the thickness of the perforated plate used in step (1) is greater than two-times of the diameter of the holes in the perforated plate.

11. A method as set forth in claim 1 wherein said drying device used in step 2 is a rotary type hot air drying machine.

12. A method as set forth in claim 1 wherein an insolubilization preventing agent is added to the aqueous polymer gel before it is dried out by hot air.

13. A method as set forth in claim 12 wherein said insolubilization preventing agent is a nitrogen-containing compound selected from the group of nitrilotriscarbonic acids, its alkali and alkaline metal salts or amido compounds, glycine, β-alanine, and glutamic acid salts.

* * * * *